United States Patent
Wallace et al.

(10) Patent No.: US 11,204,880 B2
(45) Date of Patent: *Dec. 21, 2021

(54) HASH TABLES IN FLASH MEMORY

(71) Applicant: EMC IP Holding Company LLC, Hopkinton, MA (US)

(72) Inventors: Grant R. Wallace, Pennington, NJ (US); Philip N. Shilane, Newtown, PA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/985,328

(22) Filed: Aug. 5, 2020

(65) Prior Publication Data

US 2020/0364151 A1 Nov. 19, 2020

Related U.S. Application Data

(63) Continuation of application No. 15/281,494, filed on Sep. 30, 2016, now Pat. No. 10,754,788.

(51) Int. Cl.
*G06F 12/1018* (2016.01)
*G06F 3/06* (2006.01)

(52) U.S. Cl.
CPC ........ *G06F 12/1018* (2013.01); *G06F 3/0619* (2013.01); *G06F 3/0659* (2013.01); *G06F 3/0688* (2013.01)

(58) Field of Classification Search
CPC .... G06F 3/0619; G06F 3/0659; G06F 3/0688; G06F 12/1018

USPC ......................................................... 711/103
See application file for complete search history.

(56) References Cited

U.S. PATENT DOCUMENTS

| | | | |
|---|---|---|---|
| 5,740,349 A * | 4/1998 | Hasbun | G11C 29/765 |
| | | | 714/6.13 |
| 7,702,628 B1 | 4/2010 | Luchangco | |
| 8,402,226 B1 | 3/2013 | Faibish | |
| 2007/0061504 A1 | 3/2007 | Lee | |
| 2008/0109590 A1 | 5/2008 | Jung | |
| 2009/0271435 A1 * | 10/2009 | Yako | G06F 16/2329 |
| 2010/0281149 A1 * | 11/2010 | Lin | H04L 41/5045 |
| | | | 709/223 |
| 2011/0219168 A1 | 9/2011 | Stephens | |

(Continued)

OTHER PUBLICATIONS

Unknown, "Insert, Delete, and Searching a Node in a Linked List—Algorithms Tutorial", retrieved Nov. 18, 2013, hosted by UCSEGeek.com, retrieved via the WayBack Machine, <http://web.archive.org/web/20131118211610/http://csegeek.com/csegeek/view/tutorials/algorithms/linkedJist/list_operations.php> (Year: 2013).

(Continued)

*Primary Examiner* — Reginald G Bragdon
*Assistant Examiner* — Aaron D Ho
(74) *Attorney, Agent, or Firm* — Workman Nydegger

(57) ABSTRACT

Systems and methods for managing content in a flash memory. Systems and methods for implementing hash tables in a flash memory are disclosed. A hash table may include a flat array or an array of buckets that are each associated with a linked list. Adding or removing entries from the hash table or from the linked list are achieved by performing an overwrite operation where possible to pointers affected by the table operation.

20 Claims, 10 Drawing Sheets

(56) References Cited

U.S. PATENT DOCUMENTS

2016/0099810 A1 4/2016 Li
2018/0089074 A1 3/2018 Li

OTHER PUBLICATIONS

John D. Valois. 1995. Lock-free linked lists using compare-and-swap. In Proceedings of the fourteenth annual ACM symposium on Principles of distributed computing (PODC '95). ACM, New York, NY, USA, 214-222. DOI=http://dx.doi.org/10.1145/224964.224988 (Year: 1995).
Kenneth A. Ross. 2008. Modeling the performance of algorithms on flash memory devices. In Proceedings of the $4^{th}$ international workshop on Data management on new hardware (DaMoN '08), Qiong Luo and Kenneth A. Ross (Eds.). ACM New York, NY, USA, 11-16. DOI=http://dx.doi.org/10.1145/1457150.1457153.

\* cited by examiner

| Hash Table 500 | | |
|---|---|---|
| Index | Entry (1) Data 502 | 0 — 510 |
| Index | Entry (2) Data 504 | 0 — 512 |
| Index | Entry (3) Data 506 | 0 — 514 |
| | | |
| | | |
| | | |
| Index | Entry (N) Data 508 | 0 — 516 |

Figure 5

HASH TABLES IN FLASH MEMORY

FIELD OF THE INVENTION

Embodiments of the invention relate to systems and methods for processing large datasets. More particularly, embodiments of the invention relate to data structures in flash memory and to systems and methods for implementing hash tables in flash memory.

BACKGROUND

As the amount of data in computing systems continues to increase, there is a strong desire for improvements that allow datasets to be efficiently processed. DRAM (Dynamic Random Access Memory) and the like are often too small to efficiently process large data sets. Algorithms that process data out-of-core (e.g., using Hard Disk Drives (HDDs)) tend to be slow.

One potential solution is to introduce flash memory into the computing systems. Flash memory is faster than HDDs and has the capacity to accelerate dataset analysis. Even though flash memory can improve the processing capability of the computing systems, flash memory has several problems that impact performance.

Conventional data structures are designed assuming that random changes or random edits can be performed quickly and without penalty. In contrast, there is a penalty associated with small edits or changes in a flash memory. Small edits in a flash memory require the entire edited page to be copied forward to a new page. The previous page must be eventually erased before it can be reused. More specifically, data in a used area or page of a conventional flash memory cannot be simply changed to a new value. Rather, it is necessary to erase the entire page before writing the data to the page. This is the reason that small edits to a page in the flash memory are performed by writing the data to a new page. It then becomes necessary to erase the old page.

This process causes both a performance penalty and a lifespan penalty. This process results in multiple reads and writes (thus the performance penalty). The lifespan penalty occurs because flash memory can only be written or erased a limited number of times before wearing out. Further, flash memory is typically erased in large units.

This creates additional problems when implementing data structures in the flash memory. Every time a change is made to data that is stored in the data structure, there is a potential for multiple writes and erasures. Systems and methods are needed to improve the performance of flash memory and to improve the lifespan of the flash memory and to effectively implement data structures in a flash memory.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 5 is an example of a hash table implemented in a flash memory;

DETAILED DESCRIPTION OF SOME EXAMPLE EMBODIMENTS

Figure 1:
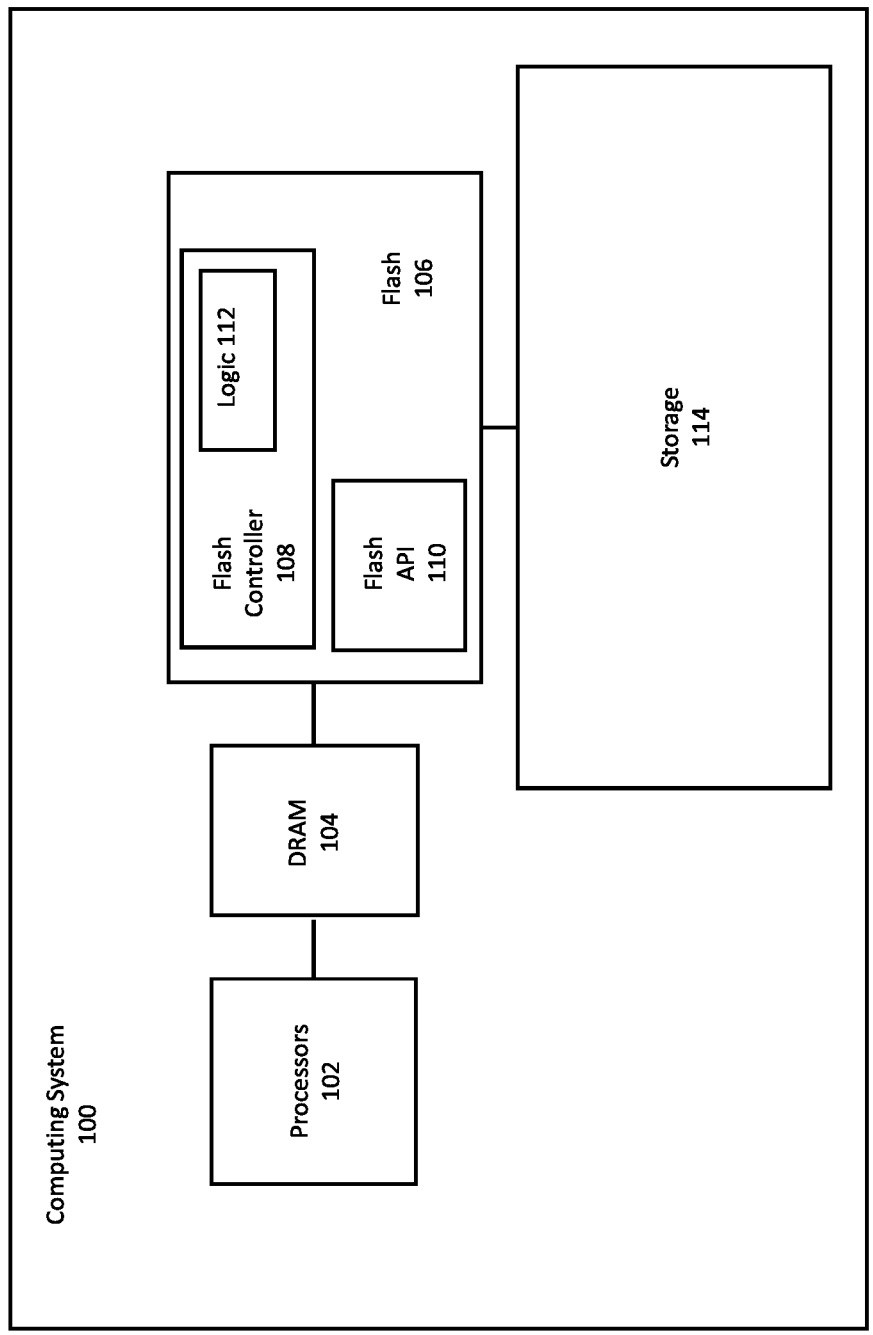
FIG. 1 illustrates an example of a computing system that is configured to perform overwrites in a flash memory.

Embodiments of the invention relate to systems and methods for processing large datasets. Embodiments of the invention further relate to systems and methods for processing large datasets in a flash memory (e.g., SSD (solid state drive)). Embodiments of the invention further relate to systems and methods for controlling or managing flash memory and to interfacing with flash memory. Embodiments of the invention further relate to data structures in a flash memory.

In a conventional flash memory, the ability to set a bit (i.e., change from a logical 0 to a logical 1) may be supported at the bit level. However, changing a bit from a logical 1 to a logical 0 (unset the bit) is not supported at this level (e.g., the bit level). Rather, it is necessary to erase a larger unit in the flash memory in order to unset bits. By way of example, flash memory may be erased in 1 megabyte units. As a result, it is not generally possible to overwrite existing data in flash with new data. Instead, new data is written to a new location (which may have been previously erased) and the old location is marked for erasure. Embodiments of the invention enable overwrites of existing data in some instances and in various data structures. Embodiments of the invention allow data structures to be implemented in flash while reducing the number of associated erasures by overwriting some of the data in the data structures.

A flash memory may include a controller and an interface (e.g., API (application programming interface) or other interface) associated with the flash memory controller. In one example, the logic of the flash memory controller is configured to perform writes to existing data (overwriting the existing data) rather than write the data to a new location and mark the old location for deletion. If necessary, the controller may cause the data to be simply written to a new location. For an overwrite operation, the controller may initially read the version of the page or block being written (i.e., the copy in the flash memory). If the changes being written only result in the setting of more logical 1s (e.g., changing 0s to 1s), then the existing page or block can be overwritten. If some bits need to be unset (changed from 1s to 0s) in the flash memory, then the write may be performed normally to a new page and the old page is marked for erasure. During this process (read-check-overwrite), the affected page or block may be locked.

In another example, an overwrite can be achieved using calls to a flash memory API. Calls include, by way of example, a logical-OR and a Compare-and-Swap.

During a logical-OR call, a client may provide a block of data and an address. The page (or pages depending on the size of the block of data) at that address is modified to the logical OR of its current contents with the provided block. This only requires setting additional bits. As a result, an overwrite may be performed on the current page or pages without the need to write to a new page or pages. The logical OR changes 0s in the target block that correspond to 1s in the new data to be set. It may not be necessary to perform an OR operation for each bit in the overwrite operation. It may only be necessary to identify the 0s that need to be changed to 1s.

An overwrite may occur in flash memory by performing a logical OR operation. This operation ensures that 1 s located in a target block are unaffected while 0s are potentially changed to 1s. The change occurs when the data being overwritten to the target block contains a 1 where the target block contains a 0. A logical OR operation between bits A and B has the possible outcomes:

| A | B | OR Result |
|---|---|---|
| 0 | 0 | 0 |
| 0 | 1 | 1 |
| 1 | 0 | 1 |
| 1 | 1 | 1 |

A Compare-and-Swap call may be used for locking and thread synchronization when performing overwrites. In a compare-and-swap call, a client provides the new version of the block. Alternatively, the client may provide both the previous version of the block and the new version of the block. The flash memory, in response to the call, may atomically read the page or block and compare the read page/block with the previous version provided by the client. If the previous version provided by the client matches the page/block read from the flash memory, then the page/block is overwritten with the new version provided by the client in the call using, for example, a logical OR. Other compare-and-swap operations to the same page are blocked until the current call completes. The block of data may also be locked using a locking data structure.

Embodiments of the invention may implement data structures in the flash memory such that the data structure can be updated using overwrites. This prolongs the life of the flash memory by limiting or reducing the number of erasures and can improve the performance of the flash memory. Examples of data structures include, but are not limited to, bloom filters, linked lists, hash tables, locking data structures, trees, graphs, and the like or combinations thereof.

FIGS. 1-4 describe a flash memory and examples of logic and calls that may be used to perform an overwrite. FIG. 1 illustrates an example of a computing system that includes a flash memory and that enables pages to be overwritten from an internal perspective and an external perspective. Overwrites to existing pages (without erasing the data first) can be achieved using internal logic. An external interface, which provides access to an API, allows similar abilities to be invoked by a client. As discussed herein, changing a bit from 0 to 1 is setting a bit and changing a bit from 1 to 0 is unsetting a bit. Unsetting bits can typically only be performed by erasing an erasure unit at a time and an erasure unit may include multiple pages.

FIG. 1 illustrates a computing device or system 100 that includes processor(s) 102, DRAM 104, flash memory 106, and storage 114. The computing system 100 may be configured to provide computing services such as backup services, document management, contact management, or the like. The computing system 100 can be formed of network connected devices or may be implemented as an integrated device. The computing system 100 can be connected to a computing network.

The storage 114 may include various hardware storage devices (e.g., magnetic, optical, etc.) such as HDDs. The storage 114 can be arranged in different manners and may include multiple devices. The DRAM 104 and the flash 106 can be used as caches in the computing system 100. The DRAM, which is the fastest memory, is typically smaller than the flash memory 106. The flash memory 106 is typically smaller than the storage 114. In other embodiments, the flash 106 may be the primary storage and the storage 114 could be omitted. The flash memory 106 can be large (e.g., terabytes or larger). The computing system 100 may be configured for processing large data sets such as backup data, data lake data, or the like.

The flash memory 106 is associated with a flash controller 108 and a flash API 110. The flash controller 108 typically controls operations occurring within the flash 106 and may include its own processor and memory and other circuitry. The flash API 110 allows clients to make specific calls to the flash memory 106, which may be executed by the flash controller 108. The client may be any device or component (e.g., processor, memory controller, process) that interacts with the flash memory 106.

The flash controller 108 is associated with logic 112 that may be configured to interact with or perform operations on the data stored in the flash memory 106. The logic 112, for example, may perform overwrites, reads, moves, copies, inserts, logical-ORs, compare-and-swaps, erasures, or the like.

Figure 2:
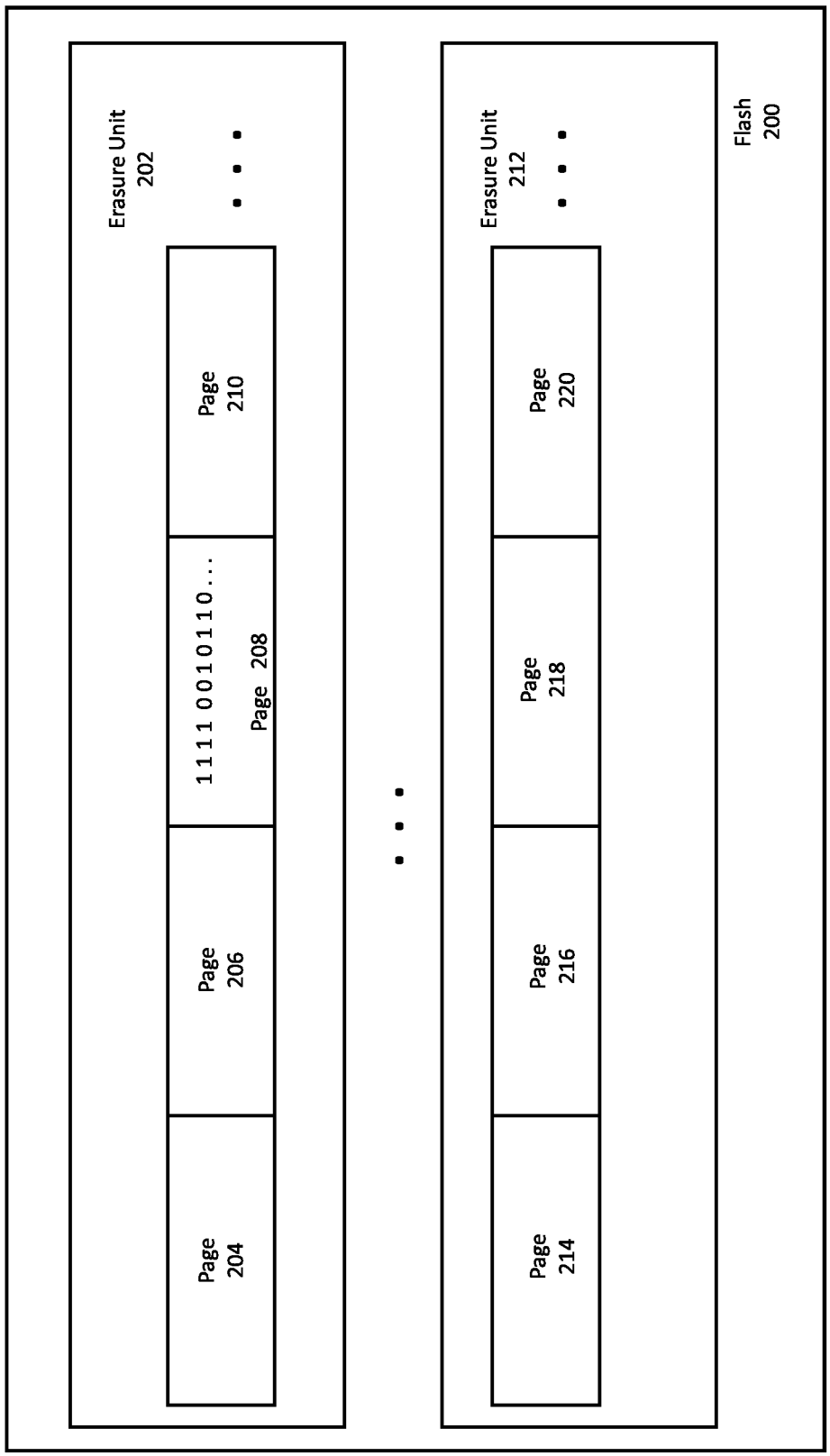
FIG. 2 illustrates an example of a flash memory that is configured to perform overwrites.

FIG. 2 illustrates an example of a flash memory and illustrates how data may be arranged in the flash memory. FIG. 2 illustrates a flash memory 200, which is an example of the flash memory 106 shown in FIG. 1. The flash memory 200 includes erasure units, such as erasure units 202 and 212. Each erasure unit is associated with pages. Pages 204, 206, 208, and 210 are associated with the erasure unit 202 and the pages 214, 216, 218, and 220 are associated with the erasure unit 212. One of skill in the art can appreciate that the flash memory is typically much larger than illustrated. Further, the size of the erasure unit 212 can be set by default or may be changed.

The pages 204, 206, 208, and 210 are smaller than the erasure unit 202. By way of example only, the pages 204, 206, 208, and 210 may be 4 KB each. The erasure units 202 and 212 may be 1 MB each. Data stored in the flash memory 200 may also be arranged in containers or using other storage arrangements. However, when data is written to the flash memory 200, the data is written in pages and the pages are usually written in sequence in some embodiments. Other memory configurations are within the scope of embodiments of the invention.

In order to overwrite a page in a conventional flash, it is necessary to erase all pages in the erasure unit before writing the pages in the newly erased erasure unit or write the new page to a new location. For example, the page 208 includes data. Because the page 208 contains data, a conventional flash cannot simply write new data to the page 208. Rather, it is necessary to erase all pages 204, 206, 208, and 210 in the erasure unit 202 before new data can be written to the page 208. Thus, all pages in the erasure unit 202 would be erased. The new data could alternatively be written to a new location and the existing page or erasure unit marked for erasure.

Embodiments of the invention, in contrast, allow data to be written to the page 208 by performing an overwrite operation. In particular, embodiments of the invention allow data to be written to the page 208 or any other page in the erasure unit 202 (or more generally in the flash memory) as long as the write makes no changes that cause specific cells (or bits) to become unset, but only changes 0s to 1s. This is because the flash memory 200 may allow more electrons to be stored in an individual cell (representing one bit) thus semantically changing the value from 0 to 1. Reducing the electrons to change a 1 to a 0, however, involves erasing an entire erasure unit due to the hardware constraints. Thus, data such as 0000 can be overwritten to become 0101 because only 0s are being changed to 1s. An overwrite is not permitted when attempting to change 1110 to 0010 because this involves changing 1s to 0s for this type of flash memory. In this case when changing 1s to 0s, it may be necessary to follow conventional flash memory writing procedures, which may involve writing the data to a new page and erasing the pages in the erasure unit.

Figure 3:
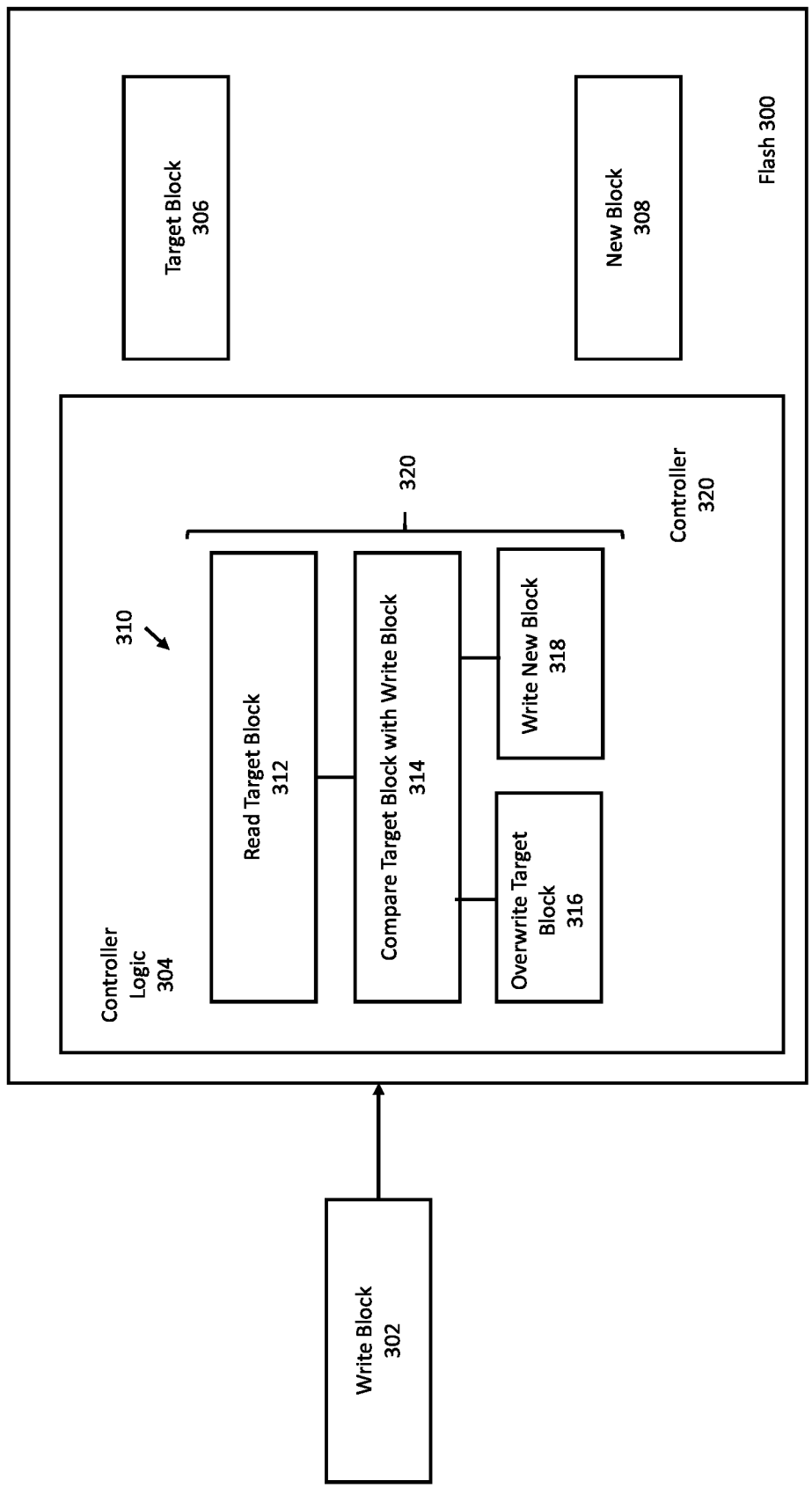
FIG. 3 illustrates an example of internal logic for overwriting portions of a flash memory.

FIG. 3 illustrates an example of a flash memory that includes a controller and illustrates an example of logic associated with performing an overwrite in the flash memory. FIG. 3 illustrates that the flash memory 300 may receive a write block 302 from a client (e.g., a thread, process, or the like). When the write block 302 is received, the controller may perform controller logic 304 to perform the write operation in the flash memory 300.

The write operation may include performing a method 310. The write block 302 may write to or correspond to more than one page in the flash memory 300. In box 312, the controller 320 may read the target block 306. The target block 306 may be, by way of example, a previous version of the write block 302. The target block 306 may be located at a destination address included in the write request received along with the write block 302.

After reading the target block 306, the controller 320 may compare the target block 306 with the write block 302. The result of the comparison determines, in one example, whether the target block 306 can be overwritten with the write block 302 or whether the write block is written to a new location as the new block 308. The comparison may identify which bits need to be changed from 0s to 1s.

In one example, if the comparison in box 314 determines that writing the write block 302 to the target block 306 would only set bits from 0s to 1s, then the target block 306 is overwritten with the write block 302 in box 316. If the comparison determines that it is necessary to reset 1s to 0s, then the write block 302 is written to a new location as the new block 308 in box 318. The target block 306 may be marked for deletion or erasure.

The logic performed in the method 310 is internal to the flash memory 300 in this example. The client associated with the write operation may not be aware of the overwrite method performed in the flash memory 300.

During the method 310 and in particular while reading the target block, comparing the target block with the write block and overwriting the target block, the page or pages associated with the target block are locked at 320 so that another client does not interfere with the method 310. A lock may be used during the overwrite method 310. The controller 320 may set aside some memory to track which regions of the flash memory 300 are locked.

Figure 4:
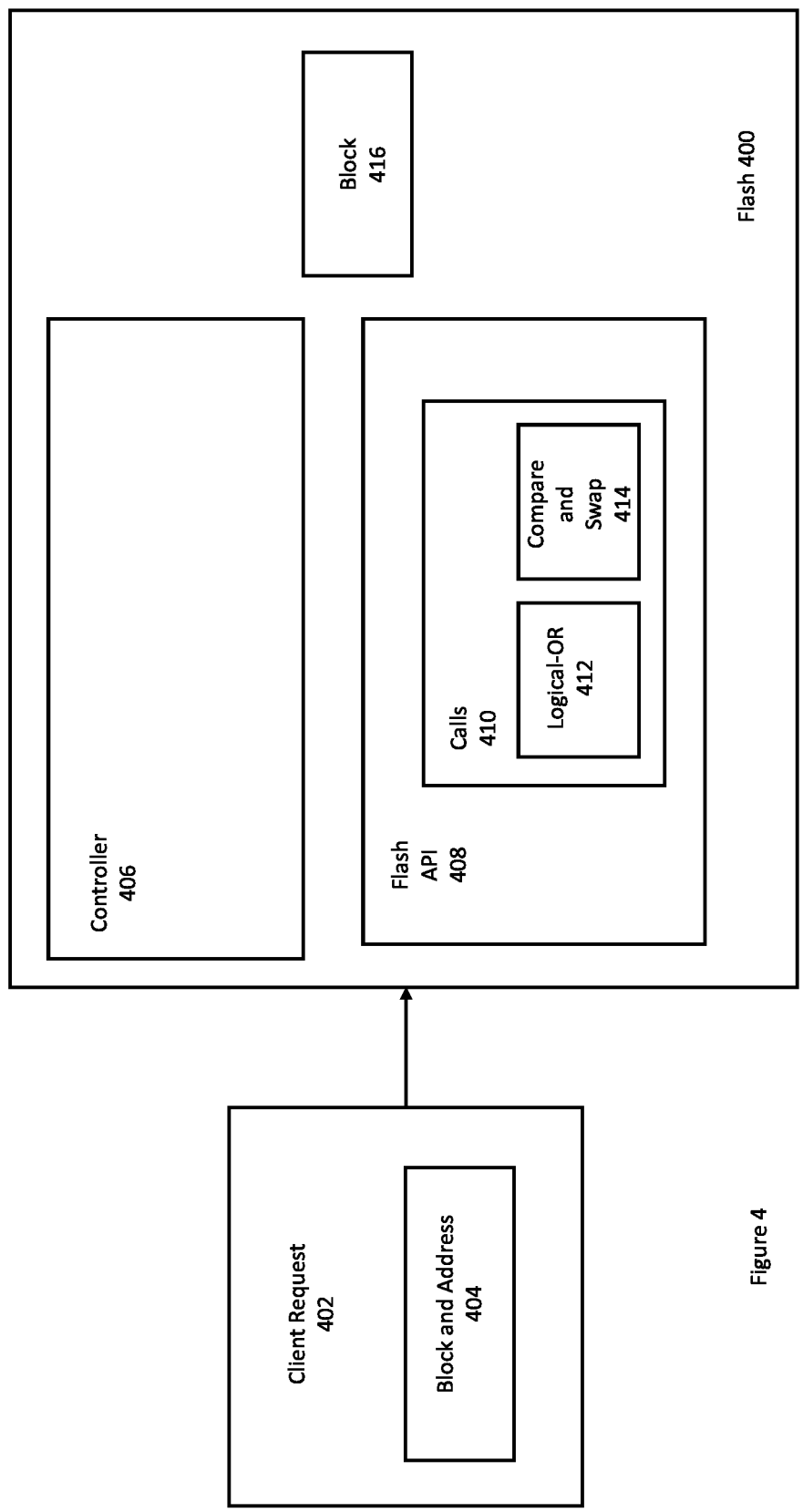
FIG. 4 illustrates an example of an external interface for overwriting portions of a flash memory and for locking portions of the flash memory when performing overwrites.

FIG. 4 illustrates an example of an external interface for overwrites in a flash memory. FIG. 4 illustrates a flash memory 400, which is an example of the flash memory 106 in FIG. 1. The flash memory 400 includes a controller 406 and an API 408. The API 408 includes calls 410 including, by way of example, a logical-OR 412 and a Compare and Swap 414.

In contrast to the internal logic illustrated in FIG. 3 (embodiments of the invention may include both internal logic and the external interface), the API allows a client to explicitly call the API 408. The logical-OR call 412 allows a client 402 to provide a block of data and an address 404. A logical OR is performed between the page or pages at the address provided in the client request 402 with the block 416 at the specified address. This call compares or performs a logical OR with each respective bit. A logical OR has the property that it never changes a one to a zero, but zeros may be changed to one if they are ORed with a one. This operation is an overwrite that potentially replaces 0s in the block 416 to 1s. The client may be aware, prior to making the call, that the necessary updates to the block 416 can be achieved with the logical OR operation. Depending on hardware capabilities, a logical OR operation may not be required for each bit. Rather, the logical OR effectively changes 0s in to the block 416 to 1s based on the contents of the block provided in the client request 402. Thus, the logical OR may simply identify the bits to be changed to 1s and make those changes. If the hardware is configured such that an entire page is written at a time, then the page is written such that the relevant 0s are changed to 1s.

The compare and swap call 414 can be used for locking and/or for thread synchronization when performing overwrites and/or for performing overwrites without locking. When making a compare and swap call 414, the client may provide a previous version of a block and a new version of the block. The new version may have new bits set. The controller 406 may then compare the previous version included in the request with the block 416 to insure that another client has not changed the block. If the comparison between the previous version included in the request and the block is equal or if the comparison only results in setting 0s to 1s, the block 416 can be overwritten (e.g., by using logical-OR operation) with the new version included in the client request 402. Other callers attempting to impact or alter block 416 will be blocked until these compare and swap operation completes. Thus, the controller 406 may also lock locations in the flash memory 400 that are being updated or changed in accordance with the controller logic or API calls 410. A compare and swap operation may thus use a locking data structure.

The calls and logic discussed herein may be implemented with computer executable instructions and the controller 406 and/or the flash memory 400 are examples of a computing device. The calls and logic discussed herein may also be used when interacting (e.g., read/write/update) with data structures implemented in a flash memory.

Embodiments of the invention relate to implementing data structures in a flash memory. An example of a data structure that can be implemented in a flash memory is a hash table. In some examples, the hash memory may be partially implemented in flash memory and partly implemented in memory such as DRAM. A hash table may also be used in conjunction with other data structures that are implemented in the flash memory.

A hash table, by way of example, is a data structure that can store data of different types. Generally, a hash table may include an array of data (each entry in the array may include a data structure or may include multiple parts). The hash table may be implemented as flat array. A hash table may be used to implement an index. For example, a hash table may be used to store the locations of data blocks or chunks in an indexed fashion. To insert a data block into the table, the data block may be hashed using a hash function. The output of the hash function may be an index into the hash table. The address of the data block in the flash memory or in another media is then stored in the hash table at that index location.

In another example, the hash table can be used to insert a data block into a memory such as a flash memory. The hash table can also be used to determine whether the data block is already stored in the flash memory. For example, when the data block is hashed, the hash table can be searched to determine whether the data block is already in the flash memory or in another memory or location. If the data block is not in the flash memory, the entry can be added to the hash table and the data block is stored in the flash memory. Thus, a hash table can be used to store data in an associative manner where data values (e.g., addresses to data blocks in a storage such as flash memory) may be associated with unique index values. A hash table can also be used for indexing structures such as databases, caches, sets, or the like. A hash table may directly store data within its internal structures instead of the location of the data stored in a separate area. As an example, hashing a value may lead to a location within the hash table where data associated with the value is stored.

In some hash tables, however, there may be a collision in the hash table where two keys map to the same value. In this example, the values may be handled in different manners. In one example, entries may be stored using open addressing. In open addressing, a deterministic method is usually followed to insert a value in the hash table. For example, a collision may cause the data to be inserted at the next available slot in a pre-determined direction. The values can be placed in a neighboring entry or slot in the hash table. An alternative mechanism to handle a collision is to rehash the value using a secondary hash function to determine an alternative location for the value. Multiple hash functions may be used to handle collisions such that values are assigned an open position in the hash table.

In another example, the hash table may be implemented as an array of buckets instead of a flat array. In this example, each entry in the hash table may contain a pointer to a data structure such as a linked list. Because the size of the hash table is typically fixed, collisions are likely to occur when the data set is large enough. Using buckets, entries can be simply added to the linked list associated with the entries' buckets. When inserting a value or node, the value can be inserted at the tail of the linked list. Alternatively, if an order of some sort is maintained, the value can be inserted at an appropriate location in the linked list.

FIG. 5 illustrates an example of a hash table implemented as a flat array. The hash table 500 is a fixed size hash table in one example. As a result, collisions may occur in the hash table 500. FIG. 5 illustrates a hash table 500 that include multiple entries (entries 1 to N) illustrated as entries 502, 504, 506 and 508. Each of the entries includes data and is associated with an index or location. Each entry in the hash table 500 includes an invalidation bit 510, 512, 514 and 516. When the invalidation bits 510, 512, 514, and 516 are 0, the entries are valid. When the invalidation bits 510, 512, 514, and 516 are set to 1, the corresponding entry is invalid.

Operations associated with the hash table 500 include remove, insert, and lookup. When implementing the hash table 500 in flash memory, all of the entries and all of the invalidation bits are zeros. By setting all of the bits to zero at initialization, the entries can be changed by performing an overwrite operation such as a logical OR operation or a compare-and-swap operation. In one example, changing an entry in a hash table may be performed using an atomic operation. An atomic operation ensures that the operation is isolated from other operations.

When an entry is invalidated, the corresponding invalidation bit is set or changed from a 0 to a 1. When the entry 502 is invalidated, for example, the bit 510 is set by an overwrite operation as discussed herein. This is advantageous in a flash memory because it prevents the entry from being erased immediately. As previously discussed, flash memory is typically erased in large increments. As a result, performing an erasure for each entry in the hash table may be inefficient and may require the entire hash table to be rewritten each time there is a change to the hash table. In contrast, setting the invalidate bit 510 can help extend the life of the flash memory in terms of writes and erasures and can allow the hash table to continue to be used without immediately rewriting the hash table to a new location in the flash memory.

Because all entries are initially 0s, entries can be added by overwriting the entry with the value being inserted. When the value for that entry changes, the old value is invalidated by setting the invalidation bit and the new value is inserted in an open slot in the hash table. When a collision occurs in the hash table 500, the entry is inserted, for example, following an open addressing scheme (e.g., coalesced hashing, cuckoo hashing, hopscotch hashing, double hashing, or the like). The hash table 500 may be cleaned periodically. This may include resetting multiple entries (i.e., setting all bits in the entries to zeros), rewriting the table to a new location, or the like.

Figure 6:
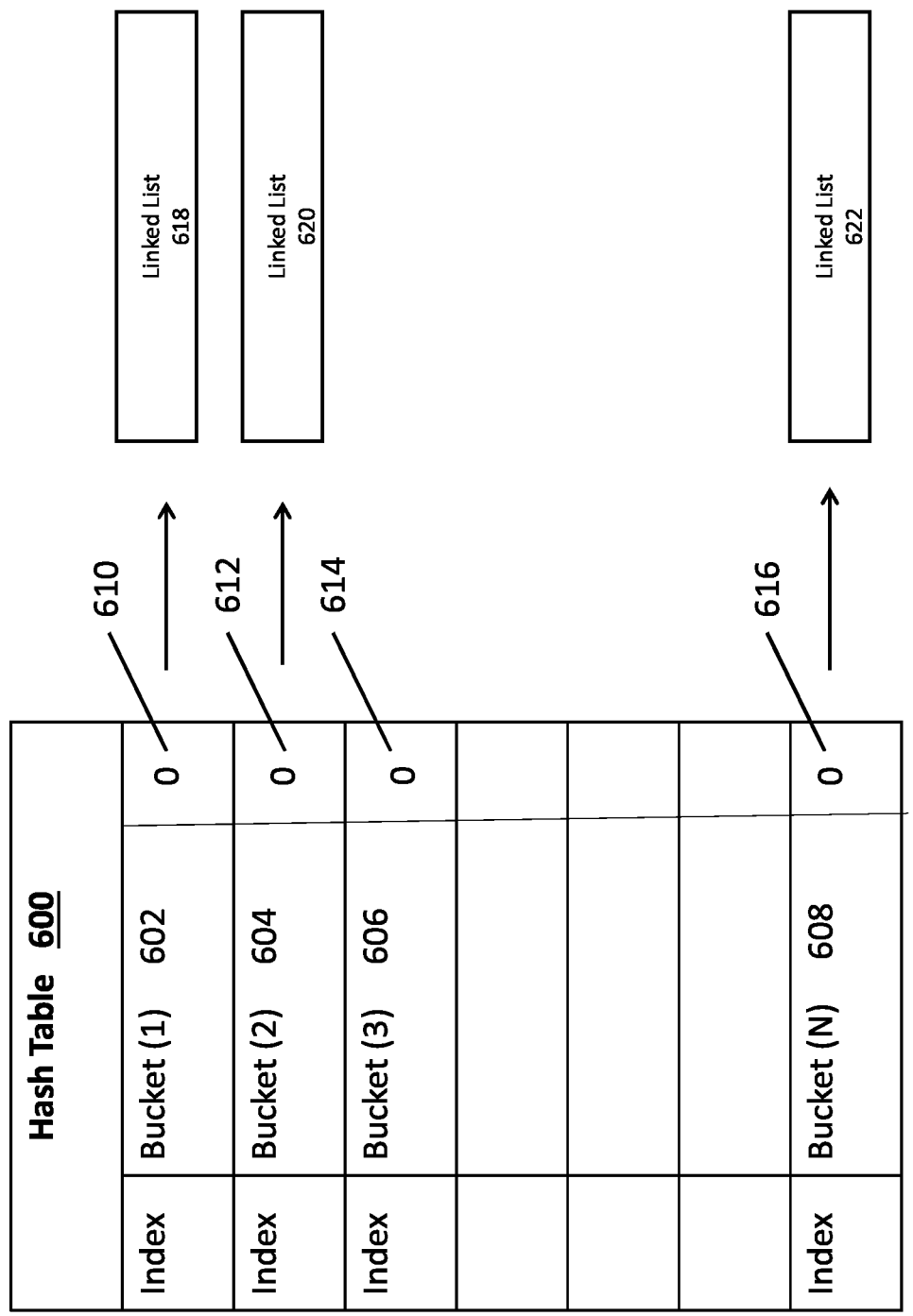
FIG. 6 is another example of a hash table implemented in a flash memory.

FIG. 6 illustrates another example of a hash table 600. The entries in the hash table 600 are buckets. FIG. 6 illustrates buckets 1 to N (illustrated as buckets 602, 604, 606, and 608). Each entry or bucket may be associated with an invalidation bit. FIG. 6 illustrates invalidation bit 610 for the bucket 602, invalidation bit 612 for the bucket 604, invalidation bit 614 for the bucket 606 and invalidation bit 616 for the bucket 608.

Each of the buckets points to a structure such as a linked list. The bucket 602 points to the linked list 618, the bucket 604 points to the linked list 620, and the bucket 608 points to the linked list 622.

As previously stated, the hash table 600 may be a fixed size. As a result, multiple keys are likely to map to the same bucket. When this occurs, the entries associated with a specific bucket can be added to the linked list. Thus, entries can be inserted by traversing the linked list and adding the entry (or node) to the appropriate location in the linked list or to the tail of the linked list. A lookup operation or search is performed in a similar manner by identifying the bucket and then traversing the linked list to find the appropriate entry.

Entries can thus be added to each bucket or removed from each bucket. FIGS. 7-10 further illustrate linked lists in a flash memory. In one example, the hash table 600 can be implemented in both memory (e.g., DRAM) and flash memory. The buckets may be implemented in DRAM, for example, and the linked lists may be implemented in flash memory. When the linked lists are updated, another in-memory table may be used to store data and/or pointers associated with nodes of the linked list. Alternatively, the entire hash table 600 may be implemented in flash memory.

An entire bucket can be invalidated by setting the corresponding invalidate bit. This allows an entire linked list to be marked for deletion or erasure and allows the hash table to be periodically cleaned. For example, the linked list associated with a particular bucket may be rewritten to a new location in flash memory. The bucket entry may be simply replaced with a new pointer to the new linked list. If the bucket portion of the hash table is stored in DRAM, it may not be necessary to set an invalidation bit because DRAM is not subject to the same limitations as flash memory as previously discussed.

Figure 7:
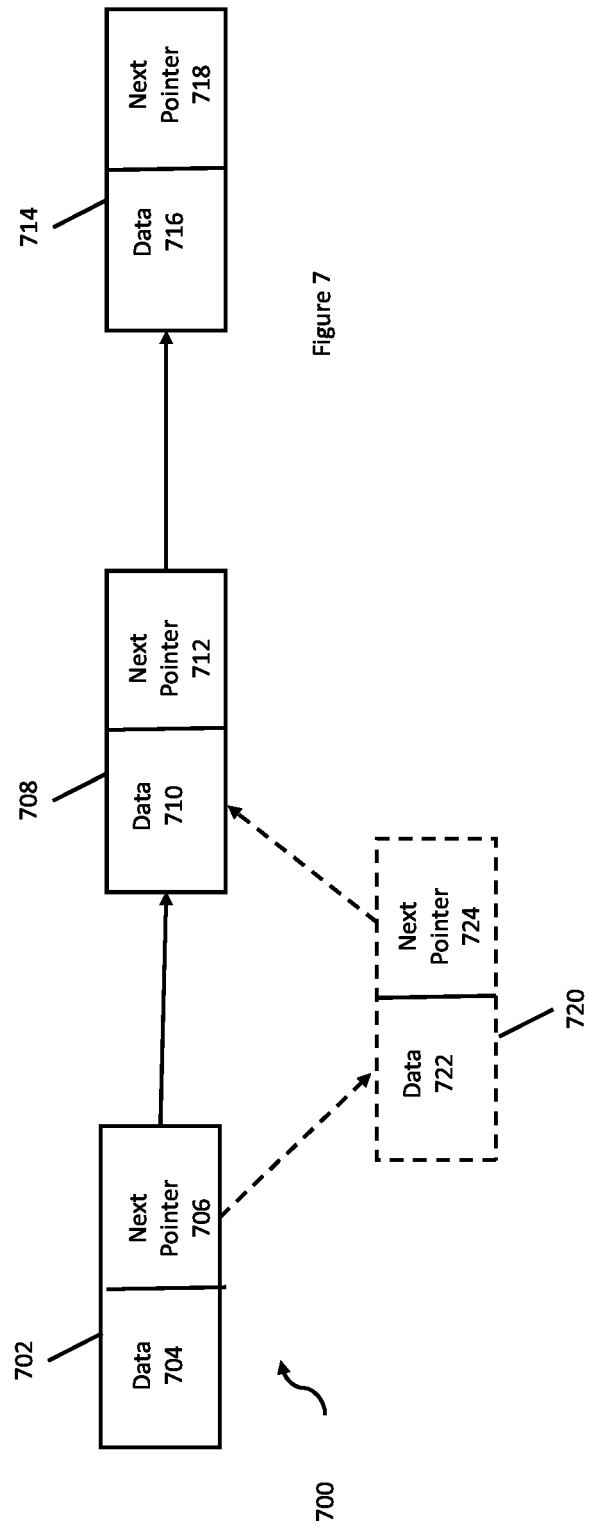
FIG. 7 illustrates an example of a linked list that can be included in a hash table.

FIG. 7 illustrates an example of a linked list that may be implemented in a flash memory. A bucket may point to the first node of the linked list. FIG. 7 illustrates a linked list 700 that includes nodes 702, 708 and 714. In one example, the data and/or the next pointer of the nodes 702, 708 and 714 may be written by overwriting the nodes or pages of the nodes as necessary. The bucket may point to the node 702.

The node 702 includes data 704 and a next pointer 706. The data 704 is the entry of the hash table. The node 702 is the head or first node of the linked list 700 in this example. The next pointer 706 points to the node 708, which includes data 710 and a next pointer 712. The next pointer 712 points to the node 714, which includes data 716 and a next pointer 718. If the node 714 is the last node of the linked list, the next pointer 718 may be set to a value indicating that it is the last node or that there are no other nodes. For example, the next pointer 718 may be NULL or may be initially set to all zeros. By setting the next pointer 718 to all zeros, adding a node at the end of the linked list is easily achieved because the next pointer 718 can easily be overwritten with the next pointer to the newly added node. Thus, the next pointer 718 to be overwritten when adding a node to the end of the linked list such that the next pointer 718 can point to the new node.

However, a node can be inserted at any point of the linked list 700. When inserting a node 720 between nodes 702 and 708, for example, the next pointer 706 points to the data 722 of the new node 720 and the next pointer 724 of the new node 720 points to the data 710 of the node 708. If possible, the next pointer 706 is overwritten. If the next pointer 706 cannot be overwritten because some of the bits need to be unset, another procedure may be followed such as discussed below with reference to FIGS. 8-10. After the node 720 is inserted, the direct link between the node 702 and 708 is no longer present in the linked list 700. A node can also be inserted at the beginning of the linked list. With the present disclosure, one of skill in the art can appreciate that the following discussion can be applied to doubly linked lists where each node includes pointers that point to the previous node and the next node. Embodiments adapt the linked list 700 so that the linked list can be implemented efficiently in a flash memory.

Figure 8:
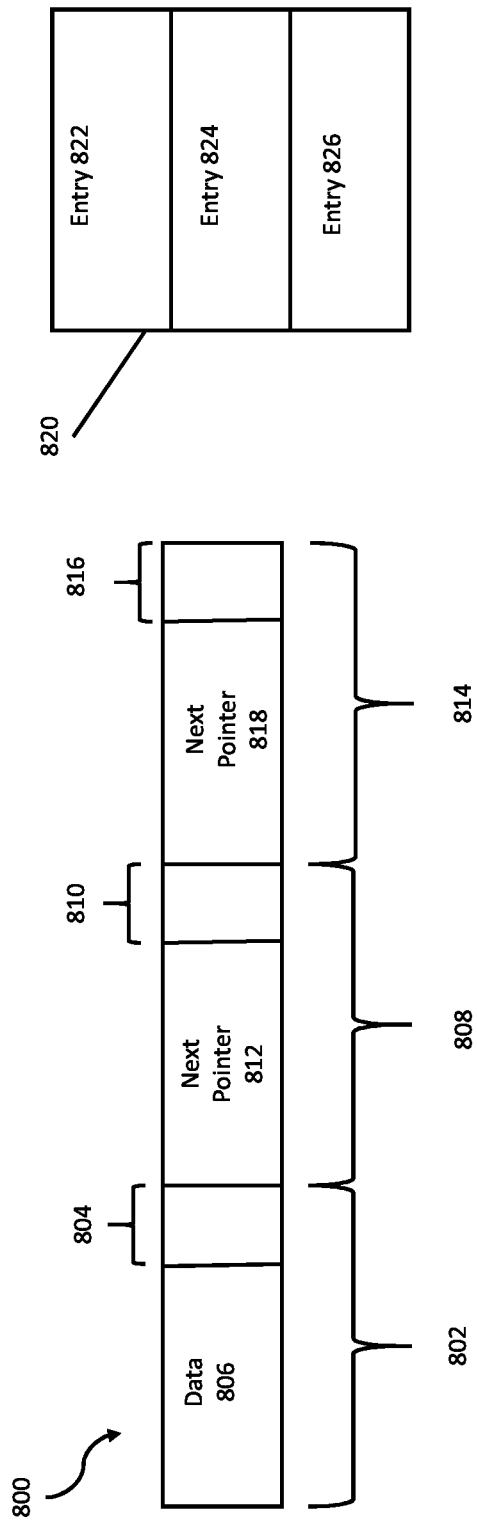
FIG. 8 illustrates an example of a node in a linked list.

FIG. 8 illustrates a more detailed example of a node 800 in a linked list. The node 800 includes a data portion 802 and a pointer portion 808. The node 800 may optionally include additional pointer portions such as the pointer portion 814. The node 800 or the linked list may also be associated with an in memory (e.g., in DRAM) table 820 (e.g., a hash table). The entries 822, 824, and 826 (the table 820 may have multiple entries) are used to store pointers. More specifically, the table 820 can be used to store next pointers of various nodes when the next pointers of those nodes cannot be overwritten. At various times, the table 820 can be written to the flash memory and the linked list or portions thereof may be rewritten. This may involve writing at least some of the nodes to new locations in the flash memory.

The data portion 802 may include data 806 and an invalid bit 804. The pointer portion 808 may include a next pointer 812 and an invalid bit 810. The pointer portion 814 may include a next pointer 818 and an invalid bit 816. Embodiments of the invention may include less than the elements illustrated in FIG. 8. For example, a node may not include the invalid bit 804 or the second pointer portion 814. Further, some of the pointer portions may not include an invalid bit. The node 800 or portions thereof is an example of the nodes 702, 708, and 714.

Conventionally, updating the pointers included in the nodes of linked lists is an expensive operation in flash memory because each operation may trigger a new page write or writes and an erasure operation. Embodiments of the invention can reduce the new page writes and the erasures. Embodiments of the invention allow linked lists to be implemented by making updates via an overwrite process when possible.

Initially, the invalid bits 804, 810 and 816 have a value equivalent to a logical 0. When it is necessary to change the next pointer 812 (e.g., when a new node is inserted into the linked list), the invalid bit 810 can be set to indicate that the next pointer 812 is no longer valid.

The pointer portion 814 is then used to store the new next pointer. Because the next pointer 818 is initially set to all zeros, the next pointer 818 can be used as the next pointer of the node 800 by overwriting the next pointer 818 with the new next pointer. This can be done using a logical OR because the contents of the next pointer 818 are initially all zeros. When the node 800 is traversed, the invalid bit 810 will cause the next pointer 818 to be used as long as the invalid bit 816 is not set. If another update is necessary to the node 800, the invalid bit 816 can be set and the new next pointer could be stored in the entry 822, which would be associated with the node 800. During a traversal when the invalid bits 810 and 816 are both set, the next pointer will be obtained from the entry 822. In one example, the table 820 may be a structure that is organized an index so the next pointer associated with node 800 can be efficiently found.

The data portion 802 may also include an invalid bit 804. When the invalid data bit is set, the data is skipped and the traversal proceeds to the next node in the linked list in accordance with the next pointer associated with the node. Thus, the data and/or pointers of nodes in the linked list can be invalidated.

Figure 9:
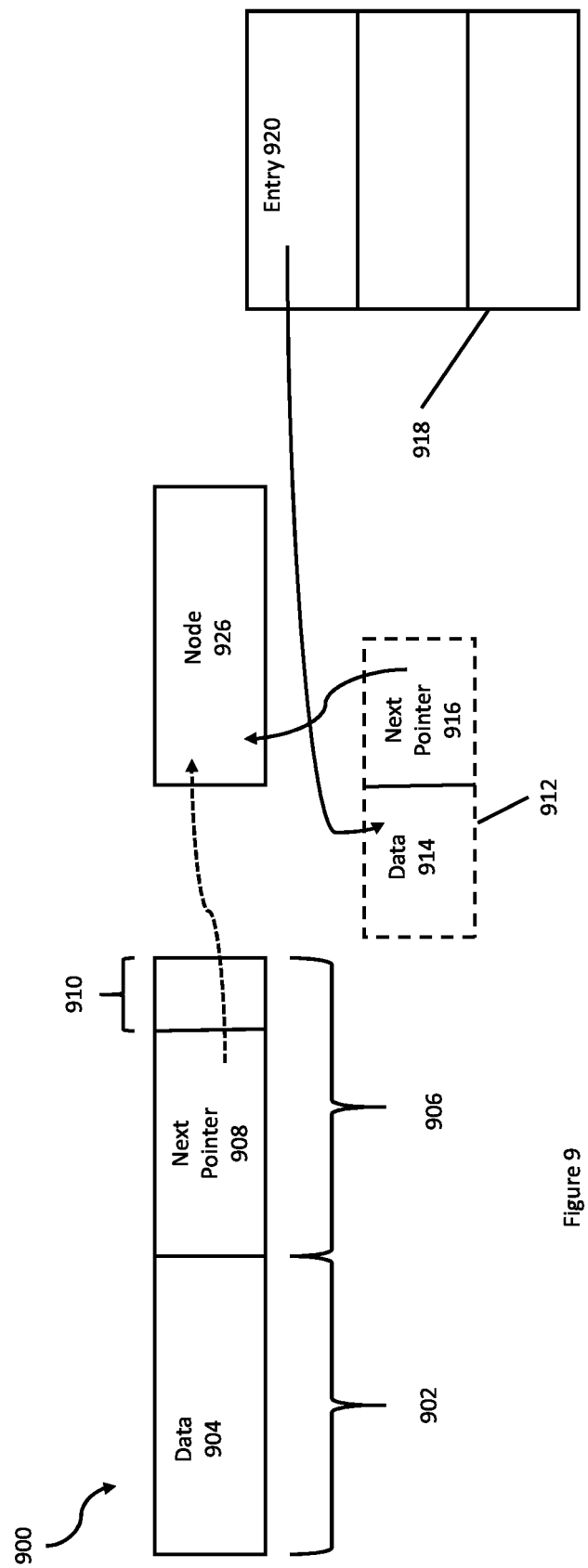
FIG. 9 illustrates an example of using an in-memory table when altering a linked list.

FIG. 9 illustrates an example of inserting a node into a linked list. The node 900 includes a data portion 902 storing data 904 and a pointer portion 906 that includes a next pointer 908 and an invalid bit 910. Initially, the next pointer 908 points to the node 926 or to the data of the node 926. When a node 912 is inserted into the linked list, embodiments of the invention can insert the node 912 without having to write the node 900 to a new location. More specifically, the invalid bit 910 is set to a 1. This indicates that the contents of the next pointer 908 are no longer valid. The new next pointer of the node 900 is inserted in the entry 920 of the table 918, which is in memory. The entry 920 thus points to the data 914 of the node 912 (which is being inserted into the linked list) and the next pointer 916 points to the node 926. Thus, when traversing the linked list and the invalid bit 910 is set, the table 918 is checked to determine the next position or node in the linked list that follows the node 900.

Inserting a node at a tail end of the linked list may be different. When inserting a node at the tail end, the next pointer of the last node can often be overwritten with a pointer to the new node because the next pointer of the last node is initially set to zeros.

In one example, however, the end node of the linked list may be deleted. As a result of this deletion, the next pointer of the current end node of the linked list may not be all 0s (because it was pointing to the now deleted tail end node) and it may not be possible to overwrite the next pointer. In this example, the next pointer may be modified to indicate that it is the last node or invalidated. Then, an entry may be made in the in-memory table such that a traversal of the linked list knows how to find the next node or such that the traversal knows that the end of the linked list has been reached. If a new node is later added to the tail end, it may be inserted as discussed herein.

Additionally, it may not be necessary to invalidate the next pointer 908 when the next pointer 908 only requires more bits to be set from 0 to 1 to become a next pointer to the node 912 or the data 914. In such a case the next pointer 908 can be overwritten by performing a logical-OR operation or a compare and swap operation to become the next pointer pointing to data 914. In this example, the next pointer 916 is set to point to the node 926 or data of the node 926. In this example where the next pointer 908 can be overwritten, it is not necessary to make an entry in the table 918.

As nodes are added to the linked list, the table 918 may become full of pointers. The linked list may then be rewritten by writing the updates or entries in the table 918 to the flash memory. This may require at least portions of the linked list to be written to new locations in the flash memory. In one example, the entire linked list may be written to a new location in the flash memory and the old linked list may be marked for erasure.

Table 918 may be implemented in many ways including as a hash table, tree, or array. The key to the table may be multiple possible values including the address of nodes (such as the flash location of node 900) or an identifier associated with data 904. The table efficiently maps from such a key to a next pointer for updated nodes.

Figure 10:
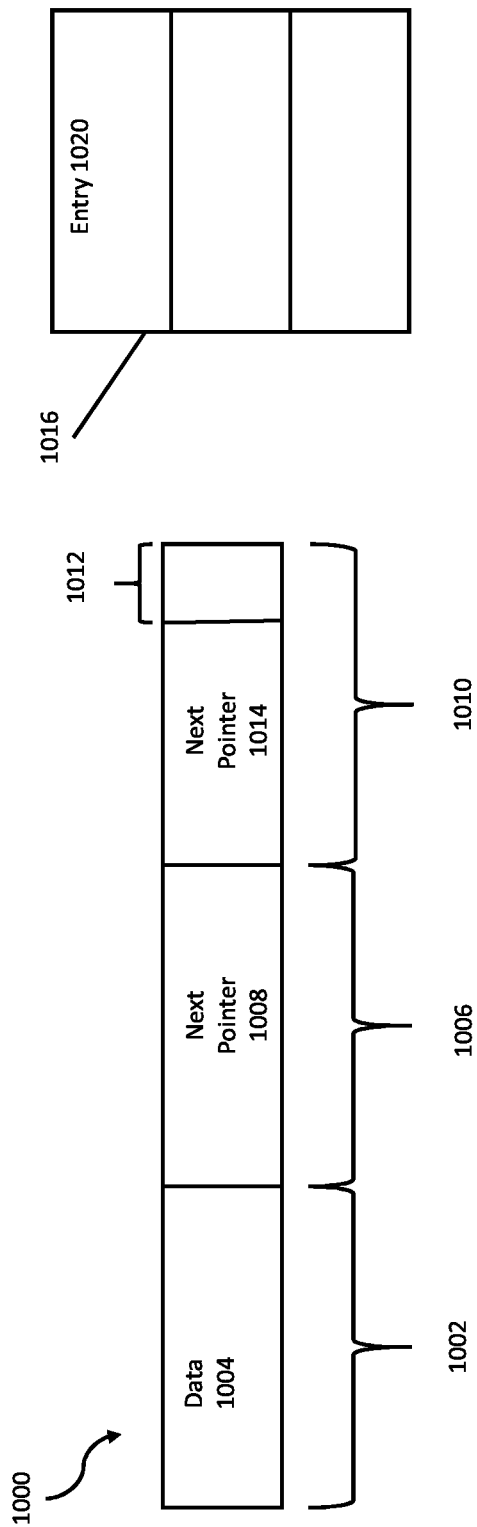
FIG. 10 illustrates another example of a node in a linked list.

FIG. 10 illustrates another example of a node that includes multiple next pointers. The node 1000 includes a pointer portion 1006 and a pointer portion 1010. In this example, the pointer portion 1010 includes a next pointer 1014 and an invalid bit 1012. Alternatively, none of the pointer portions 1006 and 1010 include an invalid bit. When inserting a node that should follow node 1000, all bits of the next pointer 1008 may be set to 1s. This is another way of indicating that the next pointer 1008 is invalid. The next pointer 1014, which is initially set to all zeros, is set to a value that points to the inserted node.

If the invalid bit 1012 is set or if the next pointer 1014 is set to all 1s, or another predefined invalid value, then the new next pointer associated with the node 1000 may be placed in the entry 1020 of the table. In some embodiments more or fewer than 2 next pointers may be included with each node in the linked list.

These examples demonstrate that the traversal of a linked list and the insertion of a node may depend on the configuration of the nodes. If a node is configured with multiple pointer portions, then these pointers can be evaluated in sequence until a valid pointer is found (which may be found in an entry in an in-memory table). Thus, if there is sufficient space in the flash memory, a node may include multiple next pointers. To update the pointer, the current pointer is set to all 1s (or the invalid bit is set) and the new pointer is inserted in the next pointer portion of the node. If necessary and if all available pointer portions are used, the new pointer may be stored in the in memory table 1016. The pointers in memory can be written to flash and the linked list revised accordingly at various times.

In another example, a pointer in a node or a data portion can be marked invalid by setting all the bits to 1s or by setting the bits to a value indicating that the pointer or data is invalid. This may include setting a certain portion to 1s. In one example, the value may be selected so that marking the pointer or data as invalid can be accomplished via an overwrite operation.

Many of the operations associated with linked list and described herein are accomplished by overwriting. Invalid bits, for example, can be performed using an overwrite operation. A next pointer can be set to all ones using an overwrite operation. When possible, the affected portions of a node are overwritten when possible. Writes to new locations are performed when unsets are required.

A node can be removed from the linked list by setting the invalid data bit in the node. This allows the linked list to be traversed while skipping the data of the effectively removed node. Alternatively, the next pointer of the previous node can be modified to point to the node that follows the node being removed. The removed node can be marked for erasure.

The foregoing discussion illustrates that a data structure such as a hash table implemented in flash memory can be managed or implemented using overwrites to effect writes rather than writing to a new location. In some instances, portions of the nodes or other elements of the data structures can be overwritten as long as the overwrite only changes 0s to 1s. As previously discussed, is cannot be changed to 0s in the flash memory unless a larger erasure unit is erased. Any changes requiring an unset (changing a 1 to a 0) may result in a write to a new location in the flash memory so that the old area can be erased. Embodiments of the invention further associate a table in memory with the data structure. The table is configured to store or buffer certain writes. For example, writes that cannot be performed via an overwrite may be stored in the table. By storing writes in a buffer or table, the need to rewrite the affected data can be delayed and batched, the number of writes to new locations and the number of erasures can be reduced.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, DRAM, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein. A controller may include a processor and memory and/or other computing chips.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for implementing a data structure in a flash memory, the method comprising:
   creating a hash table, wherein at least a portion of the hash table is implemented in the flash memory;
   receiving a call to enter a value from a client;
   when the value is entered into the hash table, adding the value to an entry in the hash table, wherein the value is associated with a key and wherein the value is added at a location indicated by a hash of the key, wherein the value is only added at the location when an existing value can be overwritten with the value by only setting bits, wherein a client providing the value specifies a method for overwriting the existing value in the call;
   when the entry in the hash table corresponds to a bucket, adding the entry to a linked list associated with the bucket, wherein the linked list is implemented in the flash memory;
   adjusting pointers associated with the linked list that are affected by the entry to the linked list by storing the pointers in a different location when unsetting bits is required to adjust the pointers associated with the linked list; and
   setting the pointers in an original location as an invalid value indicating the pointers are invalid when an overwrite operation cannot be performed, wherein the overwrite operation includes setting bits in the pointers.

2. The method of claim 1, wherein the pointers are located within nodes of the linked list wherein the nodes includes a data portion and a pointer portion.

3. The method of claim 2, wherein each node of the linked list is provisioned with one or more pointer fields.

4. The method of claim 3, wherein the one or more pointer fields are initialized to all zeros.

5. The method of claim 2, further comprising, after setting a first pointer in a first pointer field as the invalid value, adding a new pointer to a second pointer field such that the pointer portion can be evaluated in sequence until a valid pointer is found.

6. The method of claim 2, wherein the pointer portion of each node is associated with an in-memory table, wherein the table can be used to store next pointers of various nodes when the pointer portions of the nodes cannot be overwritten and invalidated.

7. The method of claim 6, wherein the in-memory table is initialized with all zeros.

8. The method of claim 6, wherein the in-memory table may be implemented as a hash table, tree, or array.

9. The method of claim 7, wherein the key to the in-memory table is an address of a node within the linked list or an identifier associated with data stored in the data portion of the node.

10. The method of claim 1, wherein setting the pointer as an invalid value comprises setting all bits of the pointers to 1.

11. The method of claim 1, wherein changing a value in a hash table is an atomic compare and swap operation such that the operation is isolated from other operations.

12. The method of claim 1, wherein the hash table is implemented in both memory and flash memory.

13. A non-transitory computer readable medium comprising computer executable instructions for performing a method, the method including implementing a data structure in a flash memory, the method comprising:
   creating a hash table, wherein at least a portion of the hash table is implemented in the flash memory;
   receiving a call to enter a value from a client;
   when the value is entered into the hash table, adding the value to an entry in the hash table, wherein the value is associated with a key and wherein the value is added at a location indicated by a hash of the key, wherein the value is only added at the location when an existing value can be overwritten with the value by only setting bits, wherein a client providing the value specifies a method for overwriting the existing value in the call;
   when the entry in the hash table corresponds to a bucket, adding the entry to a linked list associated with the bucket, wherein the linked list is implemented in the flash memory;

adjusting pointers associated with the linked list that are affected by the entry to the linked list by storing the pointers in a different location when unsetting bits is required to adjust the pointers associated with the linked list; and setting the pointers in an original location as an invalid value indicating the pointers are invalid when an overwrite operation cannot be performed, wherein the overwrite operation includes setting bits in the pointers.

14. The non-transitory computer readable medium of claim 13, wherein the pointers are located within nodes of the linked list wherein the nodes includes a data portion and a pointer portion.

15. The non-transitory computer readable medium of claim 14, wherein each node of the linked list is provisioned with one or more pointer fields.

16. The non-transitory computer readable medium of claim 15, wherein the one or more pointer fields are initialized to all zeros.

17. The non-transitory computer readable medium of claim 14, the method further comprising, after setting a first pointer in a first pointer field as the invalid value, adding a new pointer to a second pointer field such that the pointer portion can be evaluated in sequence until a valid pointer is found.

18. The non-transitory computer readable medium of claim 13, wherein setting the pointer as an invalid value comprises setting all bits of the pointers to 1.

19. The non-transitory computer readable medium of claim 13, wherein changing a value in a hash table is an atomic compare and swap operation such that the operation is isolated from other operations.

20. The non-transitory computer readable medium of claim 13, wherein the hash table is implemented in both memory and flash memory.

* * * * *